United States Patent
Hsu (10) Patent No.: US 10,353,166 B2
(45) Date of Patent: Jul. 16, 2019

(54) IMAGE FOCUS ALIGNMENT STRUCTURE HAVING TWO LAYERS OF SEALANT

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wen-Liang Hsu, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 460 days.

(21) Appl. No.: 15/147,936

(22) Filed: May 6, 2016

(65) Prior Publication Data
US 2017/0261717 A1    Sep. 14, 2017

(30) Foreign Application Priority Data
Mar. 8, 2016 (TW) ............................. 105107074 A (51) Int. Cl.
*G02B 7/00* (2006.01)
*G02B 7/08* (2006.01)

(52) U.S. Cl.
CPC .............. *G02B 7/003* (2013.01); *G02B 7/08* (2013.01)

(58) Field of Classification Search
None
See application file for complete search history.

(56) References Cited

U.S. PATENT DOCUMENTS

2012/0019940 A1* 1/2012 Lu .......................... G02B 7/025
359/819
2012/0218455 A1* 8/2012 Imai .................... G02B 13/001
348/340

FOREIGN PATENT DOCUMENTS

| CN | 1704786 | A |   | 12/2005 |
|----|---------|---|---|---------|
| CN | 1901212 | A |   | 1/2007 |
| CN | 101093268 | A |   | 12/2007 |
| CN | 201352268 |   |   | 11/2009 |
| CN | 101689012 | A |   | 3/2010 |
| CN | 201765370 | U |   | 3/2011 |
| CN | 102866563 | A | * | 1/2013 |
| TW | 200538779 | A | * | 12/2005 |
| TW | M403670 | U1 | * | 5/2011 |

OTHER PUBLICATIONS

Chinese Patent Office action 105107074 dated Mar. 2018 (Year: 2018).*
Taiwanese Office Action dated Aug. 9, 2017.
Chinese Office Action dated Jan. 31, 2019.

* cited by examiner

*Primary Examiner* — Robert E. Tallman
*Assistant Examiner* — Gary W O'Neill
(74) *Attorney, Agent, or Firm* — Rabin & Berdo, P.C.

(57) ABSTRACT

An image focus alignment structure includes a base, a lens barrel, a first sealant layer and a second sealant layer. The base has a first installation portion and a second installation portion. The lens barrel is disposed on the base. The first sealant layer is for fixing a partial barrel body of the lens barrel on the first installation portion. The second sealant layer is for fixing another partial barrel body of the lens barrel on the second installation portion.

11 Claims, 9 Drawing Sheets

IMAGE FOCUS ALIGNMENT STRUCTURE HAVING TWO LAYERS OF SEALANT

This application claims the benefit of Taiwan application Serial No. 105107074, filed Mar. 8, 2016, the disclosure of which is incorporated by reference herein in its entirety.

TECHNICAL FIELD

The disclosure relates in general to an imaging module, and more particularly to an image focus alignment structure having two layers of sealant.

BACKGROUND

Along with the advance in the optical technology, digital video recorder and digital camera have been widely used in people's everyday life. The vehicle or security surveillance cameras, such as reversing cameras or the driving recorders, normally use wide-angle lens. The vehicle or security surveillance camera is normally operated outdoors, and therefore must have high tolerance against environmental temperature or moisture.

Since it is difficult to produce an ideal bonding plane between the base and the barrel body of the lens barrel using a machining process, the lens may easily tilt during assembly and affect the imaging quality. Meanwhile, since the requirements of alignment between elements are getting higher and higher, the lens must be processed with image alignment or correction to avoid generating assembly error.

SUMMARY

The invention relates to an image focus alignment structure capable of enhancing the bonding strength between the structures and increasing the degree of alignment and the imaging quality.

According to one embodiment of the invention, an image focus alignment structure is provided. The image focus alignment structure includes a base, a lens barrel, a first sealant layer and a second sealant layer. The base has a first installation portion and a second installation portion. The lens barrel is disposed on the base. The first sealant layer is for fixing a partial barrel body of the lens barrel on the first installation portion. The second sealant layer is for fixing another partial barrel body of the lens barrel on the second installation portion.

The above and other aspects of the invention will become better understood with regard to the following detailed description of the preferred but non-limiting embodiment(s). The following description is made with reference to the accompanying drawings.

DETAILED DESCRIPTION

A number of embodiments are disclosed below for elaborating the invention. However, the embodiments of the invention are for detailed descriptions only, not for limiting the scope of protection of the invention.

First Embodiment

Referring to FIGS. 1, 2, 3A and 3B, a decomposition diagram, a partial decomposition diagram, and an assembly diagram of an image focus alignment structure 100 and a cross-sectional view along a cross-sectional line A-A of the image focus alignment structure 100 according to an embodiment of the invention are respectively shown. The image focus alignment structure 100 includes a lens set 110, a lens barrel 112, a base 120, a package substrate 130, an image sensor 132, a first sealant layer 140 and a second sealant layer 142.

Figure 1:
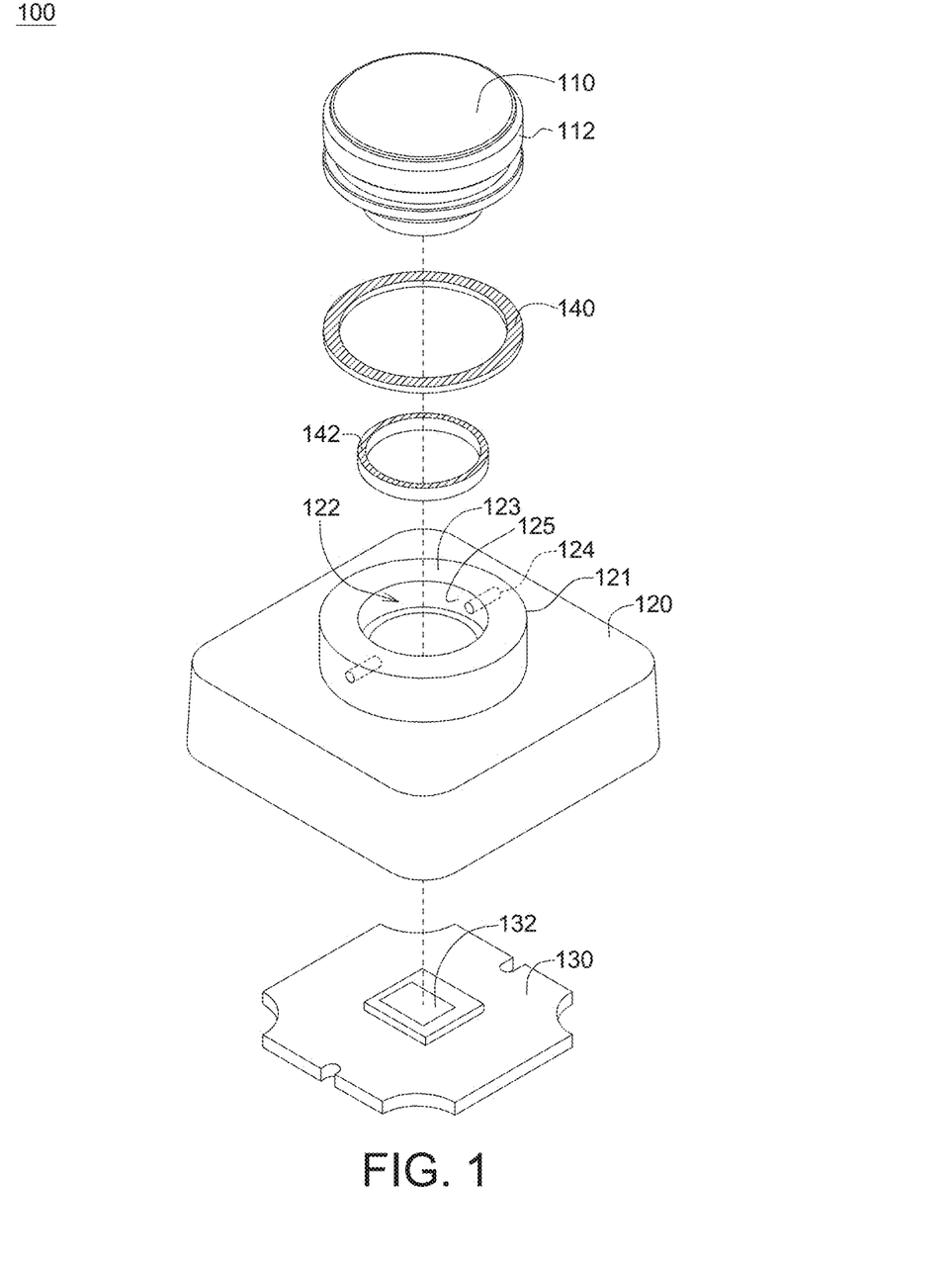
FIG. 1 is a decomposition diagram of an image focus alignment structure according to an embodiment of the invention.
Figure 2:
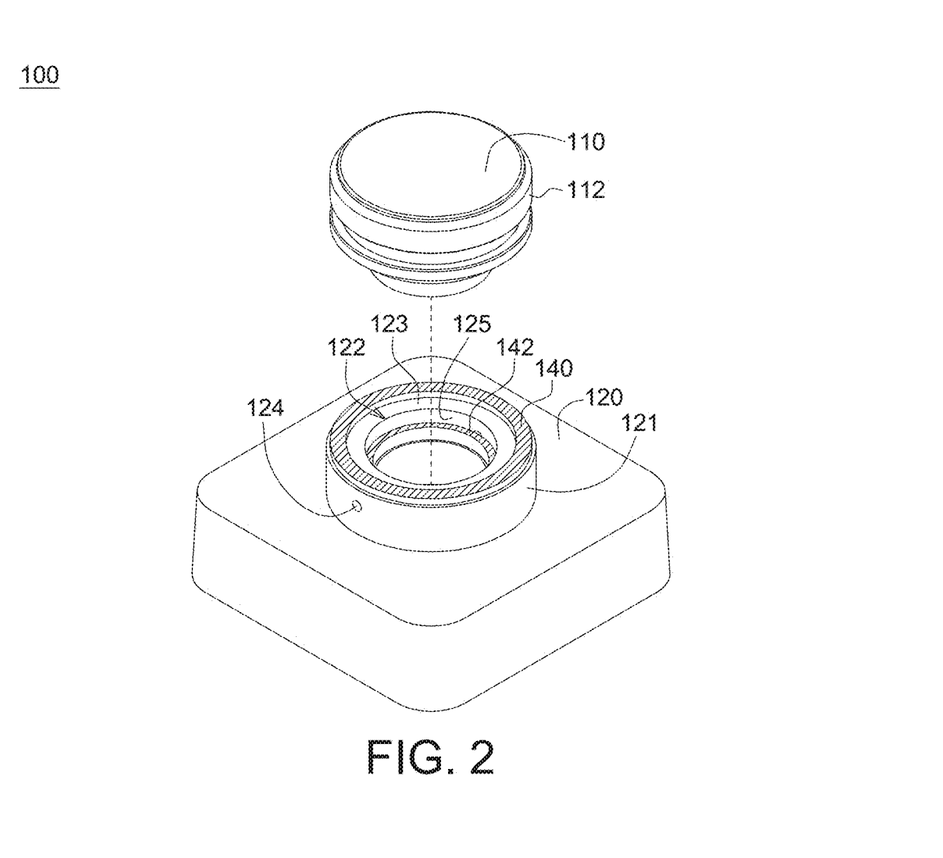
FIG. 2 is a partial decomposition diagram of an image focus alignment structure according to an embodiment of the invention.

Refer to FIG. 2. The base 120 is a hollow closed structure and has a first installation portion and a second installation portion for assembling the lens barrel 112. In an embodiment, the base 120 has a sleeve 121 disposed thereon. The sleeve 121 has a recess 122, an outer annular surface 123 and a first inner annular surface 125, wherein the outer annular surface 123 is located at one end of the sleeve 121, and the first inner annular surface 125 is located inside the recess 122. In the present embodiment, the first installation portion includes the outer annular surface 123, the second installation portion includes the first inner annular surface 125, the first sealant layer 140 is disposed on the outer annular surface 123, and the second sealant layer 142 is disposed on the first inner annular surface 125.

Refer to FIG. 2. In an embodiment, the sleeve 121 further has at least one infusing hole 124 penetrating the barrel body of the sleeve 121 to reach the recess 122. The liquid-state second sealant layer 142 can be infused into the recess 122 via the infusing hole 124. However, the invention is not limited thereto, and the second sealant layer 142 can be formed within the recess 122 using other methods.

Figure 3A:
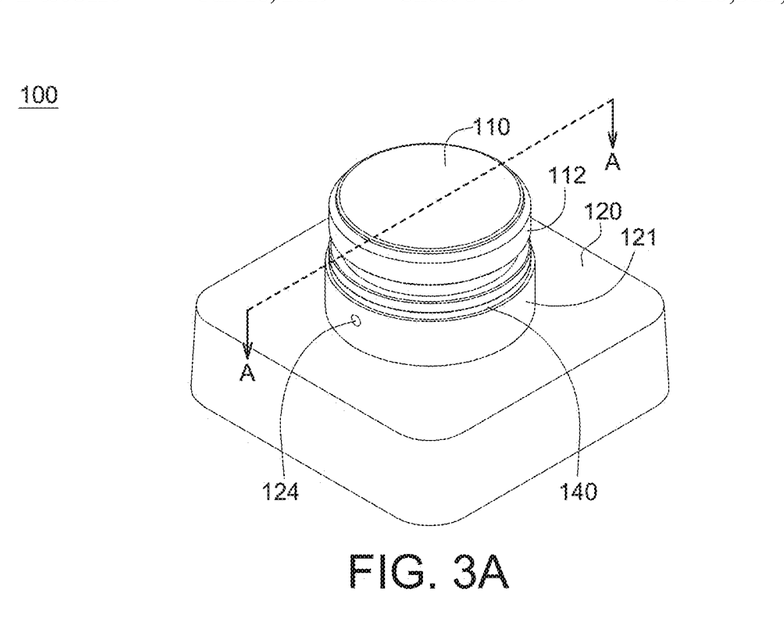
FIG. 3A is an assembly diagram of an image focus alignment structure according to an embodiment of the invention.
Figure 3B:
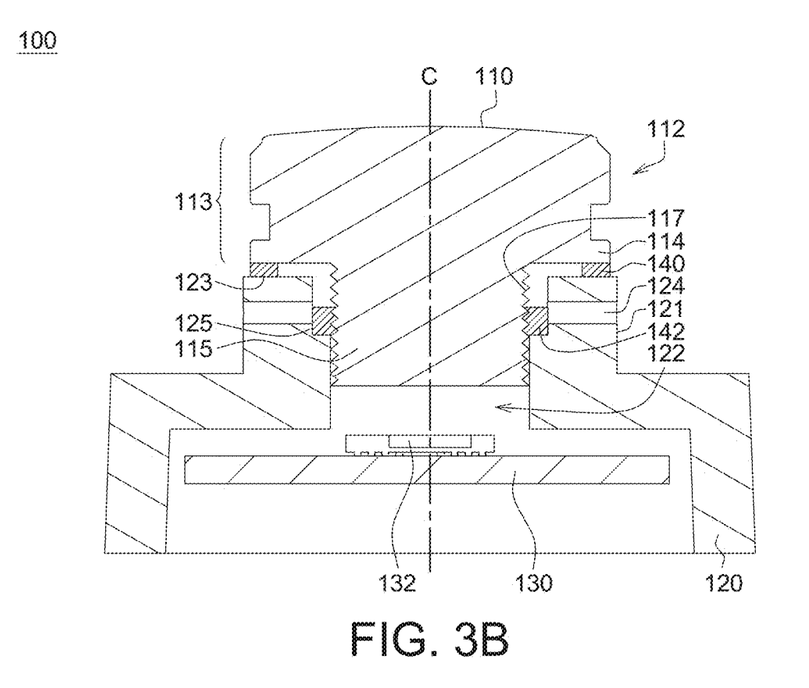
FIG. 3B is a cross-sectional view of an image focus alignment structure along a cross-sectional line A-A according to an embodiment of the invention.
Figure 4:
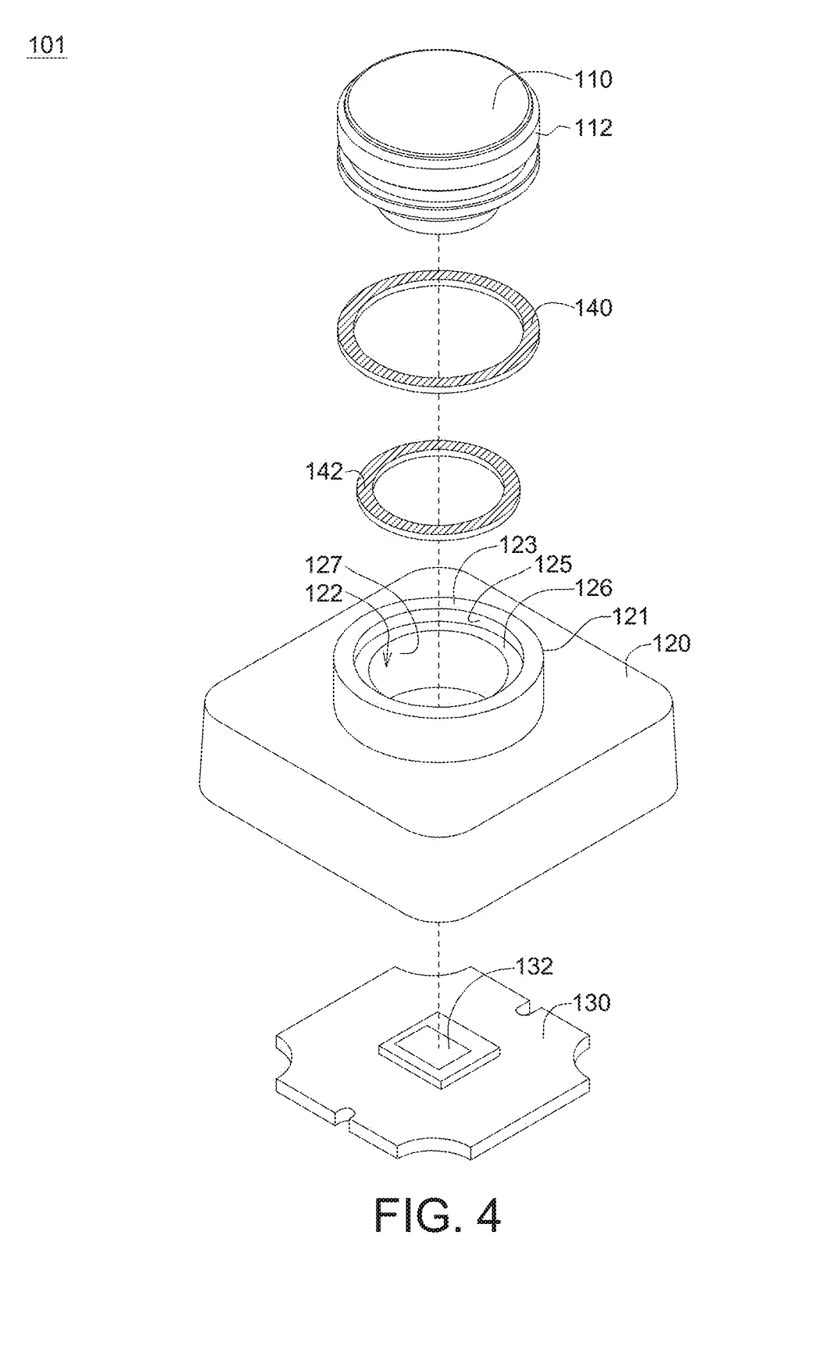
FIG. 4 is a decomposition diagram of an image focus alignment structure according to an embodiment of the invention.

Refer to FIG. 3B. The lens barrel 112 is disposed on the base 120. The lens barrel 112 has a partial barrel body 115 located inside the base 120 and another partial barrel body 113 protruded outside the base 120. The lens barrel 112 can be a hollow cylinder, and the lens set 110 is disposed within the lens barrel 112. The lens set 110 can be composed of a wide-angle lens or a plurality of lenses.

In an embodiment, the lens barrel 112 has a first flange 114 surrounding the barrel body, the partial barrel body 115 located under the first flange 114 can be received in the recess 122, and the lower surface of the first flange 114 can be fixed on the outer annular surface 123 through the first sealant layer 140.

As indicated in FIG. 3B, the image sensor 132 is disposed inside the groove of the base 120 for sensing a light entering the base 120 via the lens set 110. The light is focused by the lens set 110 to form a photo image on the image sensor 132. In an embodiment, the image sensor 132, which can be such as a CMOS image sensor or a CCD image sensor, is disposed on the package substrate 130 by way of wire-bonding or flip-chip packaging and located on the center axis C of the lens barrel 112. However, the invention does not limit the location of the image sensor 132 to the center axis C of the lens barrel 112, and the light can also be reflected to the image sensor 132 via an optical element such as a reflector or a beam splitter. Besides, the package substrate 130 can be fixed inside the base 120 by engaging the positioning hole and the positioning column (not illustrated) or can be fixed inside the base 120 by way of mounting, but the invention is not limited thereto.

Refer to FIG. 3B. To avoid assembly error, a partial barrel body 113 (the first flange 114) of the lens barrel 112 can be fixed on the outer annular surface 123 of the base 120 through the first sealant layer 140, and another partial barrel body 115 of the lens barrel 112 can be fixed on the first inner annular surface 125 of the base 120 through the second sealant layer 142.

Details of the assembly process are disclosed below. Firstly, the first sealant layer 140 is uniformly coated on the outer annular surface 123. Next, the lens barrel 112 is aligned with the recess 122, such that the first flange 114 can be vertically aligned with the outer annular surface 123, and the partial barrel body 115 can be received in the recess 122. Then, the axial and radial positions of the lens barrel 112 are adjusted, such that the center axis C of the lens barrel 112 can be aligned with the image sensor 132, and the image sensor 132 can be exactly located on the focal point of the lens set 110. After the image is adjusted to best imaging quality, the first sealant layer 140 is fixed by way of photo-curing or thermo-curing. Meanwhile, the radial and axial positions of the lens barrel 112 are fixed by the first sealant layer 140 and cannot be changed. Then, the second sealant layer 142 is infused into the recess 122 via the infusing hole 124 (such as two infusing holes 124), such that the second sealant layer 142 is interposed to the gap between the first inner annular surface 125 and the partial barrel body 115 of the lens barrel 112. After the second sealant layer 142 is cured, the radial and axial positions of the lens barrel 112 are fixed by the second sealant layer 142 and cannot be changed.

In an embodiment, the partial barrel body 115 of the lens barrel 112 has a thread 117, which has a thread profile and can be tightly engaged with the cured second sealant layer 142 to increase the engaging area and the bonding strength between the second sealant layer 142 and the lens barrel 112. Additionally, when the second sealant layer 142 is infused via the infusing hole 124, some sealant of the second sealant layer 142 will be interposed to the infusing hole 124 and cured therein to form a positioning structure such as a positioning column (not illustrated) inside the infusing hole 124 to increase the bonding strength in the axial direction.

It can be known from the above disclosure that the image focus alignment structure 100 of the present embodiment can fix the radial and axial positions of the lens barrel 112 through the first sealant layer 140 and the second sealant layer 142 to avoid assembly error being generated and affecting the imaging quality. Moreover, the first sealant layer 140 and the second sealant layer 142 can further increase the bonding strength and avoid the moisture infiltrating to the base 120 and therefore can achieve double-layer waterproof.

In an embodiment, the first sealant layer 140 and the second sealant layer 142 can be formed of the same or different materials. For example, the first sealant layer 140 can be formed of a UV-curing adhesive or a thermo-curing adhesive, the second sealant layer 14 can be formed of a thermo-curing adhesive, epoxy or a thermosetting acrylic resin. In another embodiment, the first sealant layer 140 can be formed of a UV-curing adhesive or a thermo-curing adhesive, the second sealant layer 142 can be formed of a cationic resin, such as a cationic acrylic resin. Such type of polymer contains cationic function group which provides positive charges and can be cured through transesterification. The first sealant layer 140 located inside the outer annular surface 123 of the base 120 can easily receive the light and therefore can be cured by way of photo-curing. The second sealant layer 142 located on the first inner annular surface 125 inside the base 120 could hardly receive the light and therefore can be cured by way of thermo-curing or transesterification, but the invention is not limited thereto.

Second Embodiment

Referring to FIGS. 4, 5, 6A and 6B, a decomposition diagram, a partial decomposition diagram, and an assembly diagram of an image focus alignment structure 101 and a cross-sectional view along a cross-sectional line B-B of the image focus alignment structure 101 according to an embodiment of the invention are respectively shown. The image focus alignment structure 101 includes a lens set 110, a lens barrel 112, a base 120, a package substrate 130, an image sensor 132, a first sealant layer 140 and a second sealant layer 142.

Figure 5:
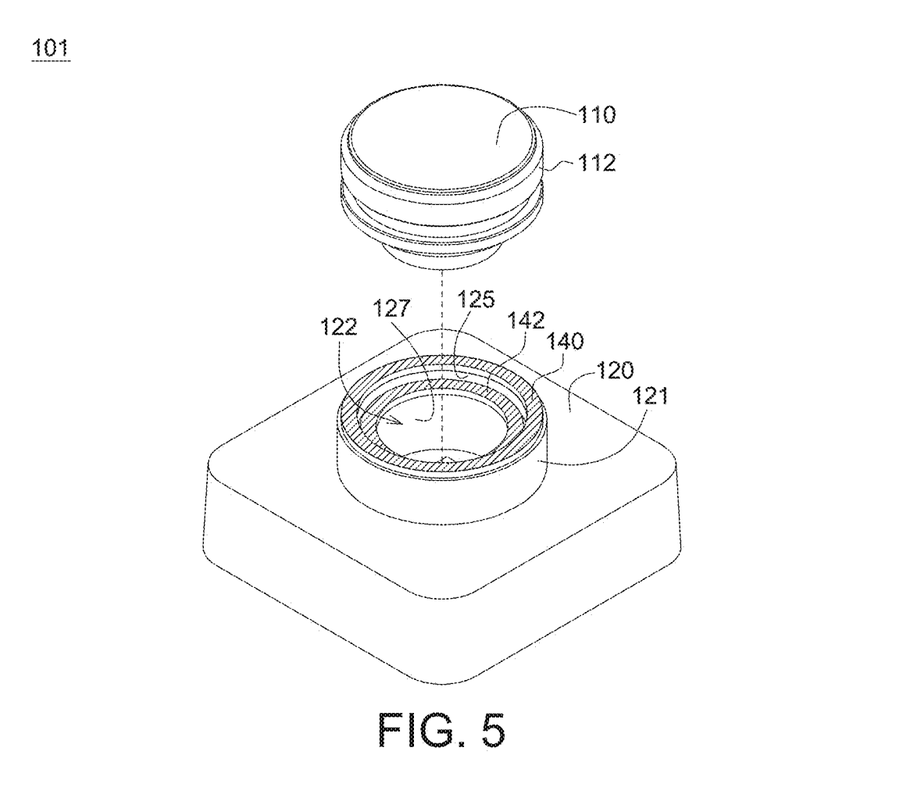
FIG. 5 is a partial decomposition diagram of an image focus alignment structure according to an embodiment of the invention.

Refer to FIG. 5. The base 120 is a hollow closed structure and has a first installation portion and a second installation portion for assembling the lens barrel 112. In an embodiment, the base 120 has a sleeve 121 disposed thereon. The sleeve 121 has a recess 122, an outer annular surface 123, a first inner annular surface 125, a stepped surface 126 and a second inner annular surface 127. The outer annular surface 123 is located at one end of the sleeve 121, the first inner annular surface 125 and the second inner annular surface 127 are located inside the recess 122, and the stepped surface 126 is vertically connected between the first inner annular surface 125 and the second inner annular surface 127. In the present embodiment, the first installation portion includes the outer annular surface 123, and the second installation portion includes the junction formed by the first inner annular surface 125 and the stepped surface 126.

Figure 6A:
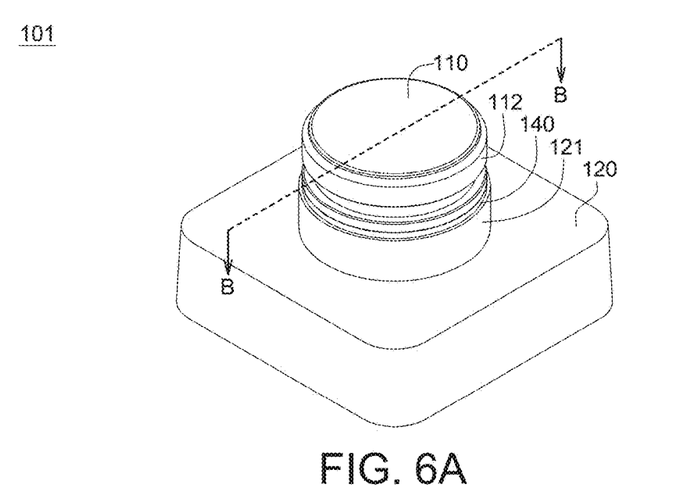
FIG. 6A is an assembly diagram of an image focus alignment structure according to an embodiment of the invention.
Figure 6B:
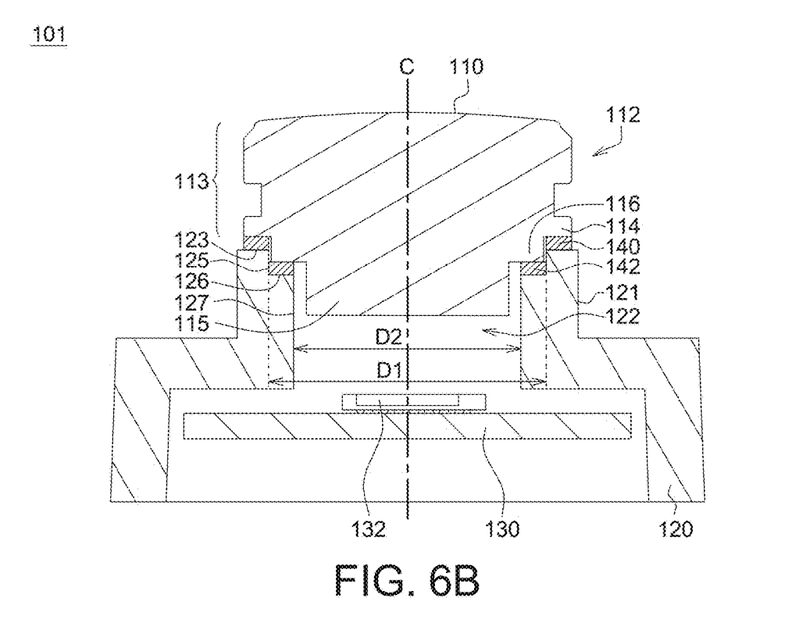
FIG. 6B is a cross-sectional view of an image focus alignment structure along a cross-sectional line B-B according to an embodiment of the invention.

Refer to FIG. 6B. The first inner annular surface 125 has a first internal diameter D1, the second inner annular surface 127 has a second internal diameter D2, and the first internal diameter D1 is larger than the second internal diameter D2. In an embodiment, the first sealant layer 140 is disposed on the outer annular surface 123, and the second sealant layer 142 is disposed at the junction between the first inner annular surface 125 and the stepped surface 126.

In an embodiment, the lens barrel 112 has a first flange 114 and a second flange 116 surrounding the barrel body, the partial barrel body 115 and the second flange 116 located under the first flange 114 can be received in the recess 122, the lower surface of the first flange 114 can be fixed on the outer annular surface 123 through the first sealant layer 140, and the second flange 116 can be fixed at the junction between the first inner annular surface 125 and the stepped surface 126 through the second sealant layer 142.

As indicated in FIG. 6B, the image sensor 132 is disposed inside the groove of the base 120 for sensing a light entering the base 120 via lens set 110. The light is focused by the lens set 110 to form a photo image on the image sensor 132. In an embodiment, the image sensor 132, such as a CMOS image sensor or a CCD image sensor, is electrically connected to and disposed on the package substrate 130 by way of wire-bonding or flip-chip packaging and located on the center axis C of the lens barrel 112. However, the invention does not limit the location of the image sensor 132 to the center axis C of the lens barrel 112. If the image sensor 132 is not located on the center axis C of the lens barrel 112, then the light can also be reflected to the image sensor 132 via an optical element such as a reflector or a beam splitter. Besides, the package substrate 130 can be fixed inside the base 120 by engaging the positioning hole and the positioning column (not illustrated) or can be fixed inside the base 120 by way of mounting, but the invention is not limited thereto.

Refer to FIG. 6B. To avoid assembly error, a partial barrel body 113 (the first flange 114) of the lens barrel 112 can be fixed on the outer annular surface 123 of the base 120 through the first sealant layer 140, and another partial barrel body 115 (the second flange 116) of the lens barrel 112 can be fixed at the junction between the first inner annular surface 125 and the stepped surface 126 of the base 120 through the second sealant layer 142.

Details of the assembly process are disclosed below. Firstly, the first sealant layer 140 is uniformly coated on the outer annular surface 123, and the second sealant layer 142 is uniformly coated on the stepped surface 126. Next, the lens barrel 112 is aligned with the recess 122, such that the first flange 114 and the second flange 116 can be vertically aligned with the outer annular surface 123 and the stepped surface 126 respectively, and the partial barrel body 115 can be received in the recess 122. Then, the axial and radial positions of the lens barrel 112 are adjusted, such that the center axis C of the lens barrel 112 can be aligned with the image sensor 132, and the image sensor 132 can be exactly located on the focal point of the lens set 110. After the image is adjusted to best imaging quality, the first sealant layer 140 is fixed by way of photo-curing or thermo-curing. Meanwhile, the radial and axial positions of the lens barrel 112 are fixed by the first sealant layer 140 and cannot be changed. Then, after the second sealant layer 142 is cured, the axial and radial positions of the lens barrel 112 are fixed by the second sealant layer 142 and cannot be changed.

It can be known from the above disclosure that the image focus alignment structure 101 of the present embodiment can fix the axial and radial positions of the lens barrel 112 through the first sealant layer 140 and the second sealant layer 142 to avoid assembly error being generated and affecting the imaging quality. Moreover, the first sealant layer 140 and the second sealant layer 142 can further increase the bonding strength and avoid the moisture infiltrating to the base 120 and therefore can achieve double-layer waterproof.

In an embodiment, the first sealant layer 140 and the second sealant layer 142 can be formed of the same or different materials. The first sealant layer 140. For example, the first sealant layer 140 can be formed of a UV-curing adhesive or a thermo-curing adhesive, the second sealant layer 14 can be formed of a thermo-curing adhesive, epoxy or a thermosetting acrylic resin. In another embodiment, the first sealant layer 140 can be formed of a UV-curing adhesive or a thermo-curing adhesive, the second sealant layer 142 can be formed of a cationic resin, such as a cationic acrylic resin. Such type of polymer contains a cationic function group which provides positive charges and can be cured through transesterification. The first sealant layer 140 located inside the outer annular surface 123 of the base 120 can easily receive the light and therefore can be cured by way of photo-curing. The second sealant layer 142 located the first inner annular surface 125 inside the base 120 could hardly receive the light and therefore can be cured by way of thermo-curing or transesterification, but the invention is not limited thereto.

Third Embodiment

Referring to FIGS. 7, 8, 9A and 9B, a decomposition diagram, a partial decomposition diagram, and an assembly diagram of an image focus alignment structure 102 and a cross-sectional view along a cross-sectional line C-C of the image focus alignment structure 102 according to an embodiment of the invention are respectively shown. The image focus alignment structure 102 includes a lens set 110, a lens barrel 112, a base 120, a package substrate 130, an image sensor 132, a first sealant layer 140 and a second sealant layer 142.

Figure 7:
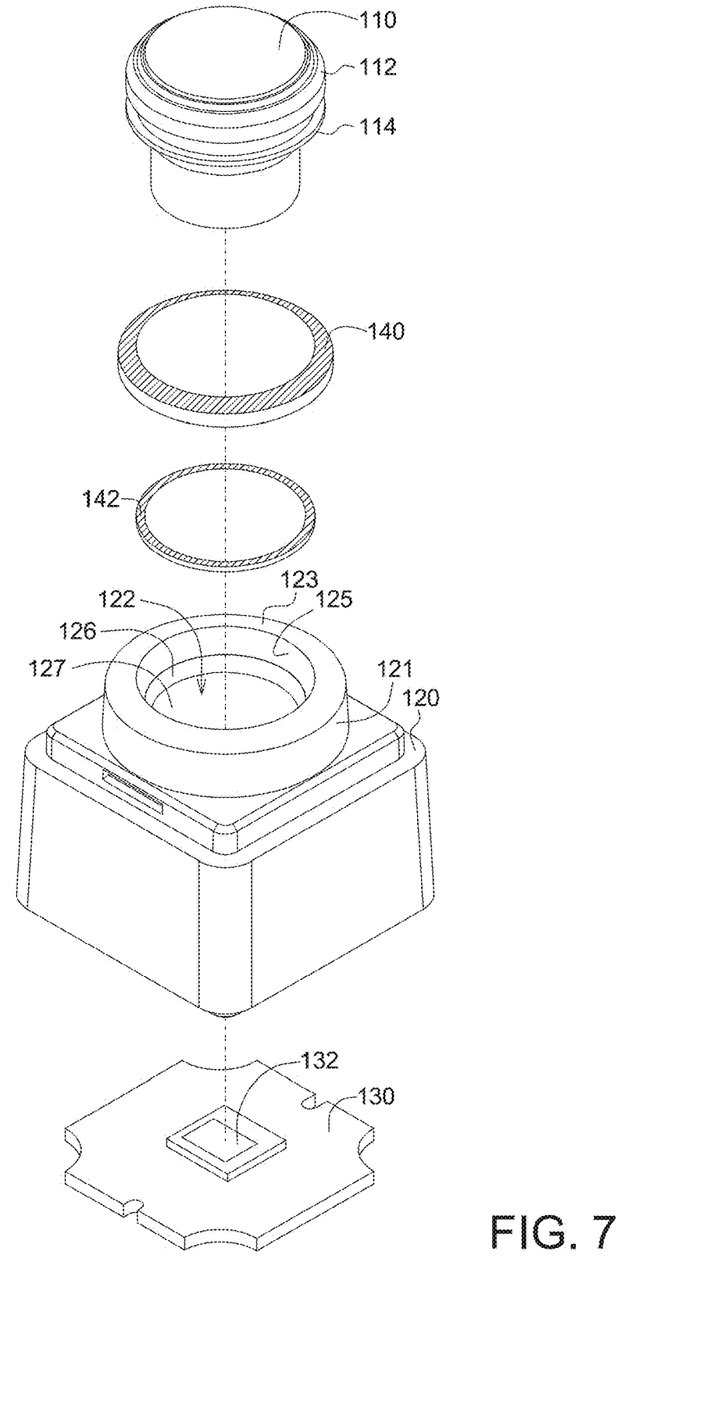
FIG. 7 is a decomposition diagram of an image focus alignment structure according to an embodiment of the invention.
Figure 8:
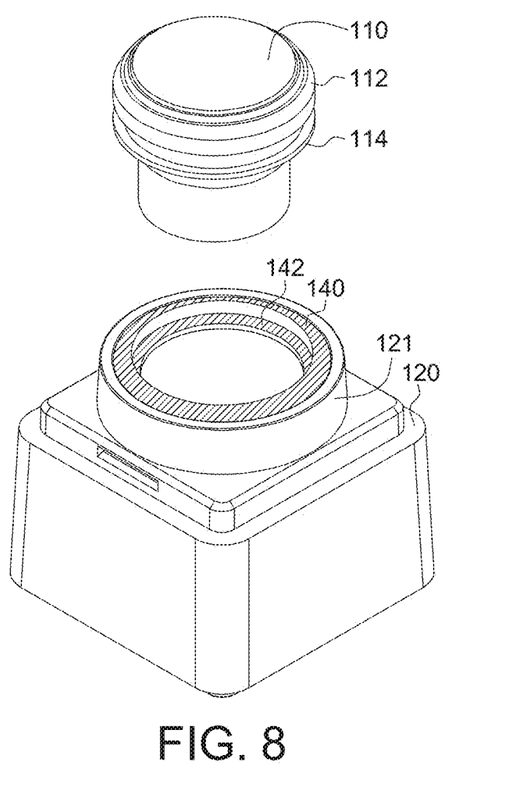
FIG. 8 is a partial decomposition diagram of an image focus alignment structure according to an embodiment of the invention.
Figure 9A:
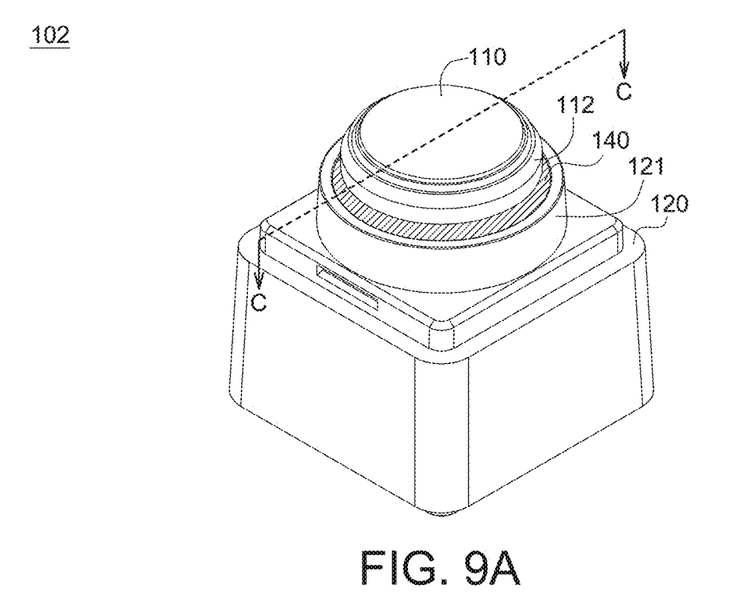
FIG. 9A is an assembly diagram of an image focus alignment structure according to an embodiment of the invention.
Figure 9B:
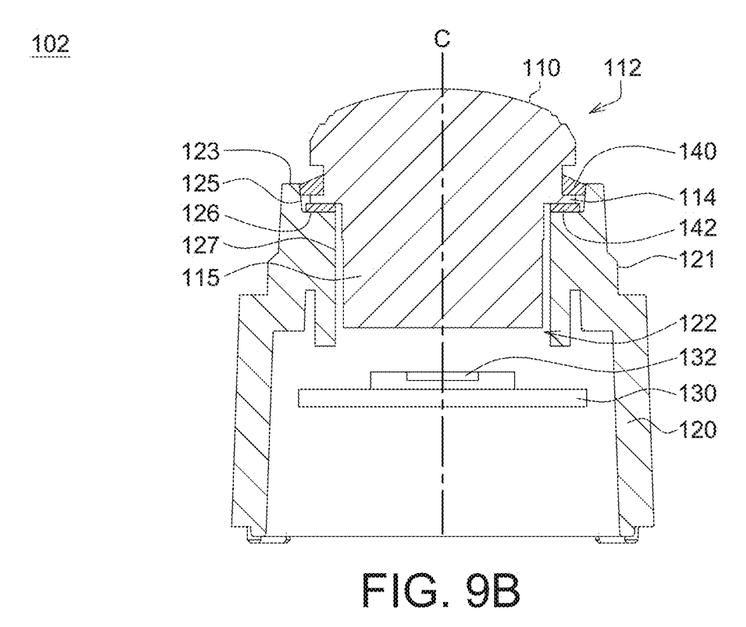
FIG. 9B is a cross-sectional view of an image focus alignment structure along a cross-sectional line C-C according to an embodiment of the invention.

The base 120 has a sleeve 121 disposed thereon. The sleeve 121 has a recess 122, an outer annular surface 123, a first inner annular surface 125, a stepped surface 126 and a second inner annular surface 127. The outer annular surface 123 is located at one end of the sleeve 121, the first inner annular surface 125 and the second inner annular surface 127 are located inside the recess 122, and the stepped surface 126 is vertically connected between the first inner annular surface 125 and the second inner annular surface 127. In the present embodiment, the first installation portion includes the first inner annular surface 125, and the second installation portion includes the stepped surface 126.

The lens barrel 112 has a first flange 114 surrounding the barrel body and disposed on the stepped surface 126. The first sealant layer 140 is disposed on the upper surface of the first flange 114 and fixes the first flange 114 on the first inner annular surface 125. The second sealant layer 142 is disposed on the lower surface of the first flange 114 and fixes the first flange 114 on the stepped surface 126.

Detailed descriptions of the image sensor 132 are disclosed above and are not repeated herein. Details of the assembly process are disclosed below. Firstly, the second sealant layer 142 is uniformly coated on the stepped surface 126, and the lens barrel 112 is aligned with the recess 122, such that the first flange 114 can be vertically aligned with the stepped surface 126, and the partial barrel body 115 can be received in the recess 122. Then, the first sealant layer 140 is uniformly coated on the upper surface of the first flange 114. The axial and radial positions of the lens barrel 112 are adjusted, such that the center axis C of the lens barrel 112 can be aligned with the image sensor 132, and the image sensor 132 can be exactly located on the focal point of the lens set 110. After the image is adjusted to best imaging quality, the first sealant layer 140 is fixed by way of photo-curing or thermo-curing. Meanwhile, the radial and axial positions of the lens barrel 112 are fixed by the first sealant layer 140 and cannot be changed. Then, after the second sealant layer 142 is cured, the axial and radial positions of the lens barrel 112 are fixed by the second sealant layer 142 and cannot be changed.

It can be known from the above disclosure that the image focus alignment structure 102 of the present embodiment can fix the axial and radial positions of the lens barrel 112 through the first sealant layer 140 and the second sealant layer 142 to avoid assembly error being generated and affecting the imaging quality. Moreover, the first sealant layer 140 and the second sealant layer 142 can further increase the bonding strength and avoid the moisture infiltrating to the base 120 and therefore can achieve double-layer waterproof.

The properties of the materials of the first sealant layer 140 and the second sealant layer 142 are disclosed above and are not repeated herein.

According to the image focus alignment structure disclosed in above embodiments of the invention, the radial and axial positions of the lens barrel are fixed using a double-layer structure of sealant, such that the image sensor can be exactly located on the focal point of the lens set, and the degree of alignment and imaging quality can be increased. Additionally, the double-layer structure of sealant is capable of enhancing the bonding strength and providing double-layer waterproof and is therefore particularly applicable to the vehicle or security surveillance cameras which are operated outdoors.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image focus alignment structure, comprising:
   a base comprising a sleeve having a first installation portion and a second installation portion, wherein the first installation portion and the second installation portion are formed on an upper surface and an inner surface of the sleeve lower than the upper surface, respectively, and an internal diameter of the inner surface is smaller than an internal diameter of the upper surface;
   a lens barrel disposed on the base;
   a first sealant layer for fixing a partial barrel body of the lens barrel to the first installation portion of the base; and
   a second sealant layer for fixing another partial barrel body of the lens barrel to the second installation portion of the base.

2. The image focus alignment structure according to claim 1, wherein the first sealant layer and the second sealant layer are formed of different materials.

3. The image focus alignment structure according to claim 2, wherein the first sealant layer is a photo-curing adhesive, and the second sealant layer is a thermo-curing adhesive.

4. The image focus alignment structure according to claim 2, wherein the first sealant layer is a photo-curing adhesive, and the second sealant layer is a cationic resin.

5. The image focus alignment structure according to claim 1, wherein the sleeve has an outer annular surface, a recess and a first inner annular surface, the outer annular surface is located at one end of the sleeve, the first inner annular surface is located inside the recess, the first installation portion comprises the outer annular surface, the second installation portion comprises the first inner annular surface, the first sealant layer is disposed on the outer annular surface, and the second sealant layer is disposed on the first inner annular surface.

6. The image focus alignment structure according to claim 5, wherein the sleeve further has at least one infusing hole penetrating the sleeve to reach the recess.

7. The image focus alignment structure according to claim 5, wherein the lens barrel has a first flange surrounding the barrel body, the another partial barrel body located under the first flange is received in the recess, and the first flange is fixed on the outer annular surface through the first sealant layer.

8. The image focus alignment structure according to claim 7, wherein the sleeve has a stepped surface and a second inner annular surface disposed inside the recess, the stepped surface is vertically connected between the first inner annular surface and the second inner annular surface.

9. The image focus alignment structure according to claim 8, wherein the another partial barrel body located under the first flange further has a second flange received in the recess and fixed at a junction between the first inner annular surface and the stepped surface through the second sealant layer.

10. The image focus alignment structure according to claim 1, wherein the sleeve has an outer annular surface, a recess, a first inner annular surface, a stepped surface and a second inner annular surface, the outer annular surface is located at one end of the sleeve, the first inner annular surface is located inside the recess, the stepped surface is vertically connected between the first inner annular surface and the second inner annular surface, the first installation portion comprises the first inner annular surface, the second installation portion comprises the stepped surface, the first sealant layer is disposed on the first inner annular surface, and the second sealant layer is disposed on the stepped surface.

11. The image focus alignment structure according to claim 10, wherein the lens barrel has a first flange surrounding the barrel body, the another partial barrel body located under the first flange is received in the recess, an upper surface of the first flange is fixed on the first inner annular surface through the first sealant layer, and a lower surface of the first flange is fixed on the stepped surface through the second sealant layer.

\* \* \* \* \*